(12) United States Patent
Lee et al.

(10) Patent No.: US 9,671,982 B2
(45) Date of Patent: Jun. 6, 2017

(54) METHOD OF PERFORMING CLOUD PRINTING AND MOBILE DEVICE, IMAGE FORMING APPARATUS, AND CLOUD PRINTING SYSTEM FOR PERFORMING USING THE SAME

(71) Applicant: Samsung Electronics Co., Ltd., Suwon-si (KR)

(72) Inventors: Joong-mok Lee, Suwon-si (KR); Seung-hae Yang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/564,253

(22) Filed: Dec. 9, 2014

(65) Prior Publication Data
US 2015/0160899 A1    Jun. 11, 2015

(30) Foreign Application Priority Data
Dec. 9, 2013    (KR) .......................... 10-2013-0152610

(51) Int. Cl.
G06F 3/12 (2006.01)
H04L 29/08 (2006.01)
H04L 29/06 (2006.01)

(52) U.S. Cl.
CPC .......... G06F 3/1209 (2013.01); G06F 3/1204 (2013.01); G06F 3/1228 (2013.01); G06F 3/1288 (2013.01); G06F 3/1292 (2013.01); H04L 67/02 (2013.01); H04L 67/42 (2013.01)

(58) Field of Classification Search
CPC .... G06F 3/1209; G06F 3/1288; G06F 3/1228; G06F 3/1204; G06F 3/1292; H04L 67/42; H04L 67/02
USPC ...................................... 358/1.13, 1.15, 1.16
See application file for complete search history.

(56) References Cited

U.S. PATENT DOCUMENTS

| 2012/0086980 | A1* | 4/2012 | Numata ................ G06F 3/1204 358/1.15 |
| 2012/0300242 | A1* | 11/2012 | Meike ................... G06F 3/1219 358/1.13 |
| 2013/0021638 | A1* | 1/2013 | Hong .................... G06F 3/1204 358/1.14 |
| 2013/0114107 | A1  | 5/2013 | Park |
| 2015/0153975 | A1* | 6/2015 | Mori ..................... G06F 3/1206 358/1.14 |

FOREIGN PATENT DOCUMENTS

| KR | 10-2012-0038870 | 4/2012 |
| KR | 10-2012-0064210 | 6/2012 |
| KR | 10-2012-0064213 | 6/2012 |
| KR | 10-2012-0078827 | 7/2012 |
| KR | 10-2013-0049124 | 5/2013 |
| KR | 10-2013-0061482 | 6/2013 |

\* cited by examiner

Primary Examiner — Kent Yip
(74) Attorney, Agent, or Firm — Staas & Halsey LLP

(57) ABSTRACT

A method of performing cloud printing is provided. The method may include generating a virtual apparatus corresponding to an image forming apparatus in a mobile device, receiving, by the mobile device, a job request for the virtual apparatus, and when the mobile device is connected to the image forming apparatus, transmitting the received job request to the image forming apparatus.

9 Claims, 11 Drawing Sheets

FIG. 7A

| Virtual Printer | Real Printer MAC Address | Capability |
|---|---|---|
| #vp1 | dd.cc.bb.aa | Color/Black |
| #vp2 | hh.gg.ff.ee | Black |

FIG. 7B

| Virtual Printer | Mobile Device MAC Address | Capability | Port |
|---|---|---|---|
| #vp1 | aa.bb.cc.dd | Color/Black | xx |
| #vp2 | aa.bb.cc.dd | Black | yy |

METHOD OF PERFORMING CLOUD PRINTING AND MOBILE DEVICE, IMAGE FORMING APPARATUS, AND CLOUD PRINTING SYSTEM FOR PERFORMING USING THE SAME

CROSS-REFERENCE TO RELATED APPLICATIONS

This application claims the priority benefit of Korean Patent Application No. 10-2013-0152610, filed on Dec. 9, 2013, in the Korean Intellectual Property Office, the disclosure of which is incorporated herein in its entirety by reference.

BACKGROUND

1. Field

One or more embodiments relate to a method of performing cloud printing and a mobile device, image forming apparatus, and cloud printing system for performing using the same.

2. Description of the Related Art

Cloud printing denotes a service that enables a user to upload its own data to a cloud server, and allows to print the data uploaded in cloud server at a desired time and place according to the user's request. In a related art environment using the cloud printing service, a multifunctional printer of a user is previously registered in the cloud server. However, when it is impossible for a printer to access the cloud server due to a limitation of a network environment, the cloud printing service cannot be provided. In a related art cloud printing service, a user accesses the cloud server by using an application to register a document which is to be printed, or designates a pre-registered document and transmits the designated document to a printer registered in the cloud server, thereby printing the document. Alternatively, as in legacy printing, a user accesses the cloud server through a host, and downloads a printing-desired document to the host, thereby requesting to print the document.

In this case, a printer is registered in the cloud server, and a job processing protocol, requested by a provider that provides the cloud service, is supported for the registration.

SUMMARY

In an aspect of one or more embodiments, there is provided a method of performing cloud printing by using a mobile device without a limitation of connection with an image forming apparatus and a mobile device, image forming apparatus, and cloud printing system for performing using the same.

In an aspect of one or more embodiments, there is provided a method of performing cloud printing by using a mobile device which includes generating a virtual apparatus, corresponding to an image forming apparatus, in a mobile device; receiving, by the mobile device, a job request for the virtual apparatus; and when the mobile device is connected to the image forming apparatus, transmitting the received job request to the image forming apparatus.

The method may further include registering the generated virtual apparatus in a cloud server.

The receiving of a job request may include receiving a job request for the registered virtual apparatus from the cloud server.

The receiving of a job request may include receiving a job request for data, stored in the mobile device, from a user.

The generating of a virtual apparatus may include: requesting the image forming apparatus for information which is necessary to generate the virtual apparatus; receiving the information, which is necessary to generate the virtual apparatus, from the image forming apparatus in response to the request; and generating the virtual apparatus, based on the information necessary to generate the virtual apparatus.

The information necessary to generate the virtual apparatus may include at least one of an MAC address and a capability of the image forming apparatus.

The registering of the generated virtual apparatus may include registering the virtual apparatus in correspondence with the MAC address of the mobile device.

The transmitting may include: determining whether the mobile device is connectable to the image forming apparatus; when it is determined that the mobile device cannot be connected to the image forming apparatus, storing the received job request; and when the mobile device is connected to the image forming apparatus, transmitting the stored job request to the image forming apparatus.

The job request for the virtual apparatus may be transmitted by using an MAC address of the mobile device associated with the virtual image forming apparatus registered in the cloud server.

In an aspect of one or more embodiments, there is provided a cloud printing system which includes a mobile device that includes: a virtual apparatus generating unit that generates a virtual apparatus corresponding to an image forming apparatus; a communication unit that transmits a registration request for the generated virtual apparatus, receives a job request for the generated virtual apparatus, and transmits the received job request to the image forming apparatus; and a control unit that controls the communication unit to transmit the registration request for the generated virtual apparatus, receive the job request for the generated virtual apparatus, and transmit the received job request to the image forming apparatus; a cloud server that includes: a virtual apparatus managing unit that registers the virtual apparatus according to the registration request; a communication unit that receives the transmitted registration request for the virtual apparatus from the mobile device, and transmits a job request for the virtual apparatus, registered in the virtual apparatus managing unit, to the mobile device; and a control unit that controls the communication unit to receive the transmitted registration request for the virtual apparatus from the mobile device and transmit a job request for the virtual apparatus, registered in the virtual apparatus managing unit, to the mobile device; and an image forming apparatus that includes: a communication unit that receives the job request for the generated virtual apparatus; a job performing unit that performs an operation, based on the received job request; and a control unit that controls the communication unit to receive the job request for the generated virtual apparatus.

In an aspect of one or more embodiments, there is provided a mobile device which includes a virtual apparatus generating unit that generates a virtual apparatus, corresponding to an image forming apparatus, in the mobile device; a communication unit that receives a job request for the generated virtual apparatus, and when the communication unit is connected to the image forming apparatus, transmits the received job request to the image forming apparatus; and a control unit that controls the communication unit to receive a job request for the generated virtual apparatus, and when the communication unit is connected to the image forming apparatus, to transmit the received job request to the image forming apparatus.

The communication unit may transmit a registration request for the generated virtual apparatus to a cloud server, and receives a job request for the virtual apparatus, which is registered in the cloud server based on the registration request, from the cloud server, and the control unit may control the communication unit to transmit a registration request for the generated virtual apparatus to a cloud server, and receive a job request for the virtual apparatus, which is registered in the cloud server based on the registration request, from the cloud server.

The mobile device may further include: a storage unit that stores data; and a user interface that receives an input from a user, wherein the control units may control the user interface to receive a job request for the stored data from the user.

The communication unit may request the image forming apparatus for information which is necessary to generate the virtual apparatus, and receive the information, which is necessary to generate the virtual apparatus, from the image forming apparatus in response to the request. The virtual apparatus generating unit may generate the virtual apparatus, based on the information necessary to generate the virtual apparatus. The control unit may control the communication unit to request the image forming apparatus for the information, which is necessary to generate the virtual apparatus, and receive the information, which is necessary to generate the virtual apparatus, from the image forming apparatus in response to the request. The information necessary to generate the virtual apparatus may include at least one of an MAC address and a capability of the image forming apparatus.

The control unit may control the communication unit to add content, indicating that the image forming apparatus is registered in correspondence with an MAC address of the mobile device, into the registration request, and transmit the registration request including the content.

The mobile device may further include: a determination unit that determines whether the mobile device is connectable to the image forming apparatus; and a storage unit that stores, when it is determined that the mobile device cannot be connected to the image forming apparatus, the received job request, wherein the control unit may control the storage unit to store, when it is determined that the mobile device cannot be connected to the image forming apparatus, the received job request.

In an aspect of one or more embodiments, there is provided an image forming apparatus which includes a communication unit that receives a request for information, which is necessary to generate a virtual apparatus, from a mobile device, transmits the information necessary to generate the virtual apparatus in response to the request, and when the communication unit is connected to the mobile device, receives a job request for the virtual apparatus, which is generated in the mobile device based on the transmitted information necessary to generate the virtual apparatus, from the mobile device; an image forming job performing unit that performs job according to the received job request; and a control unit that controls the communication unit to receive the request for the information, which is necessary to generate the virtual apparatus, from the mobile device, transmit the information necessary to generate the virtual apparatus in response to the request, and when the communication unit is connected to the mobile device, receive a job request for the virtual apparatus, which is generated in the mobile device based on the transmitted information necessary to generate the virtual apparatus, from the mobile device.

In an aspect of one or more embodiments, there is provided at least one non-transitory computer readable medium storing computer readable instructions which when executed implement methods of one or more embodiments.

BRIEF DESCRIPTION OF THE DRAWINGS

These and/or other aspects will become apparent and more readily appreciated from the following description of embodiments, taken in conjunction with the accompanying drawings in which:

FIGS. 7A and 7B are diagrams for describing a virtual image forming apparatus generated in the mobile device and a virtual image forming apparatus registered in the cloud server, according to an embodiment;

DETAILED DESCRIPTION

Figure 1:
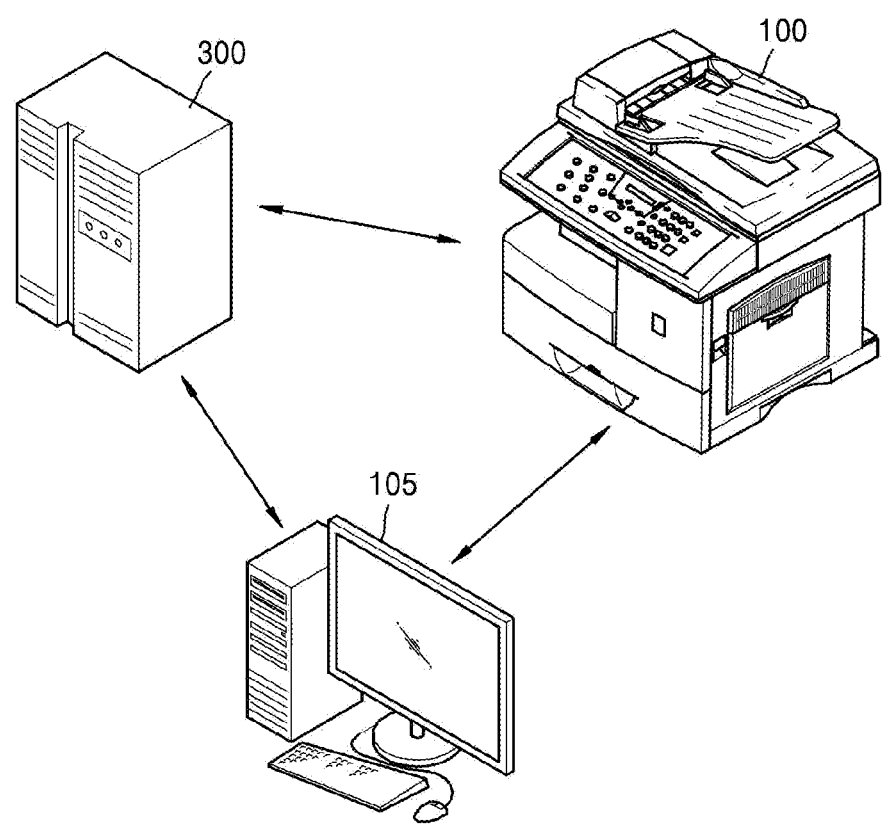
FIG. 1 is a diagram illustrating a related art cloud printing system environment.

Reference will now be made in detail to embodiments, examples of which are illustrated in the accompanying drawings, wherein like reference numerals refer to like elements throughout. Embodiments may have different forms and should not be construed as being limited to the descriptions set forth herein. Accordingly, embodiments are merely described below, by referring to the figures, to explain aspects of the present disclosure. Expressions such as "at least one of," when preceding a list of elements, modify the entire list of elements and do not modify the individual elements of the list.

FIG. 1 is a diagram illustrating a related art cloud printing system environment.

The related art cloud printing system environment includes a cloud server 300, an electronic device 105, and an image forming apparatus 100. Examples of the electronic device may include various devices such as a notebook computer, a personal computer (PC), a tablet PC, a personal digital assistant (PDA), etc. The image forming apparatus 100 is an image forming apparatus that supports a job processing protocol requested by a provider that provides a cloud service, for always providing a cloud printing service. The image forming apparatus 100 may perform print function, copy function, fax function, scan function. Examples of the image forming apparatus may include various devices such as a printer, a scanner, a copier, a fax-machine and MFP (multifunctional printer).

In order to use the cloud printing service, a user executes an application by using the electronic device 105, accesses the cloud server 300 to register a document (which is stored in its own account) to be printed or to select a pre-registered document, and selects one the image forming apparatus 100 registered in the cloud server 300.

The cloud server 300 transmits printing data to the image forming apparatus 100 registered in the cloud server 300. The cloud server 300 is physically connected to the image forming apparatus 100. For example, the cloud server 300 may be physically connected to the image forming apparatus 100 over the Internet.

In the case of using a related art legacy printing service, the electronic device 105 accesses the cloud server 300 to download a document to be printed. The user requests a connection from the image forming apparatus 100 directly connected to the electronic device 105 so as to print the downloaded document, thereby allowing the document to be printed.

In the related art cloud printing system environment, when the cloud server 300 is not physically connected to the image forming apparatus 100, it is unable to use the cloud printing service. Also, when the image forming apparatus 100 does not provide the cloud service, it is unable to use the cloud printing service.

Even in the legacy printing service, when the electronic device 105 is not actually connected to the image forming apparatus 100, it is unable to print a document.

Figure 2:
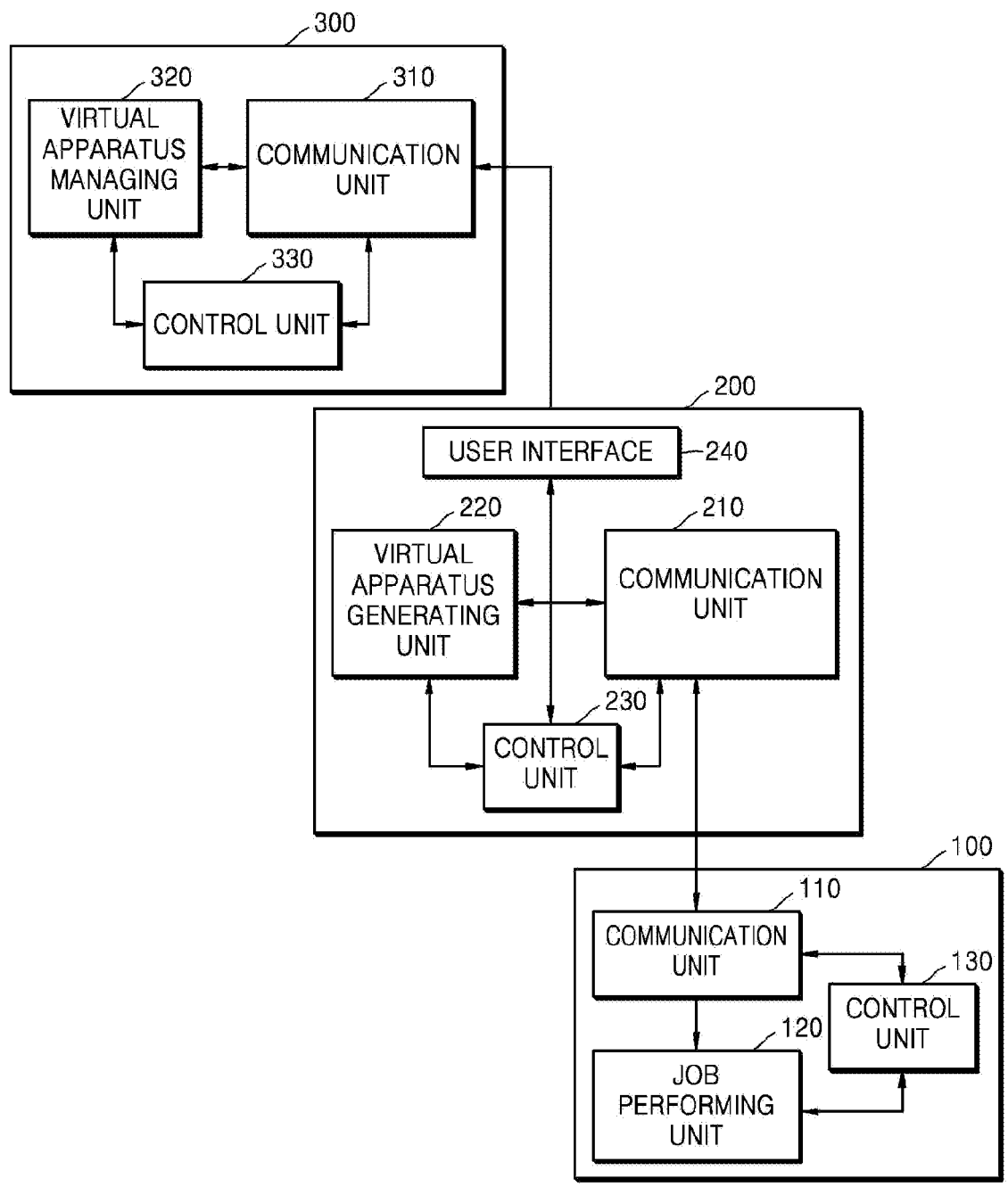
FIG. 2 is a diagram illustrating a cloud printing system according to an embodiment.

FIG. 2 is a diagram illustrating a cloud printing system according to an embodiment.

Referring to FIG. 2, the cloud printing system according to an embodiment includes an image forming apparatus 100, a mobile device 200, and a cloud server 300.

The image forming apparatus 100 includes a communication unit 110, a job performing unit 120, and a control unit 130.

The communication unit 110 receives a job request for a registered virtual image forming apparatus from the cloud server 300, but the present embodiment is not limited thereto. When the mobile device 200 does not register a generated virtual image forming apparatus in the cloud server 300, the mobile device 200 may receive a job request for the virtual image forming apparatus from a host (not shown). In particular, when the mobile device 200 is connected to the image forming apparatus 100, the job request for the virtual image forming apparatus may be transmitted from the mobile device 200, and received by the image forming apparatus 100. Alternatively, the image forming apparatus 100 may directly receive the job request for the virtual image forming apparatus from the mobile device 200. In order for the mobile device 200 to generate a virtual image forming apparatus, the image forming apparatus 100 receives a request for information, which is necessary to generate the virtual image forming apparatus, from the mobile device 200. In response to the received request, the image forming apparatus 100 may transmit the information necessary to generate the virtual image forming apparatus.

The job performing unit 120 performs a job on the basis of the received job request. In specific, the job performing unit 120 may perform an image forming job on the basis of the received job request. For example, the image forming apparatus 100 may perform a document printing job.

The control unit 130 controls an operation of the communication unit 110. Also, the control unit 130 may control an operation of the job performing unit 120.

The mobile device 200 includes a communication unit 210, a virtual apparatus generating unit 220, a control unit 230, and a user interface 240.

The communication unit 210 may transmit a registration request for a virtual image forming apparatus which is generated in the virtual apparatus generating unit 220, and receive a job request for the virtual image forming apparatus. In this case, the job request for the virtual image forming apparatus may be received from a host (not shown) or the cloud server 300. Also, the communication unit 210 may transmit the received job request to the image forming apparatus 100. In order to generate the virtual image forming apparatus, the communication unit 210 may request the image forming apparatus 100 for information necessary to generate the virtual image forming apparatus, and receive the information, which is necessary to generate the virtual image forming apparatus, from the image forming apparatus 100 in response to the request. The control unit 230 may control the communication unit 210 to add information (which indicates that the image forming apparatus 100 is registered in correspondence with a media access control (MAC) address of the mobile device 200) into the registration request and to transmit the registration request including the information.

The virtual apparatus generating unit 220 generates the virtual image forming apparatus corresponding to the image forming apparatus 100. In detail, the virtual apparatus generating unit 220 generates the virtual image forming apparatus corresponding to the image forming apparatus 100 on the basis of the information which is necessary to generate the virtual image forming apparatus and is received by the communication unit 210.

The user interface 240 receives an input from the user. In particular, the user interface 240 receives a request for data, stored in a storage unit (not shown), from the user. In addition, the user may select a virtual image forming apparatus through the user interface 240, or the user interface 240 may receive various inputs such as an input which selects a connectable image forming apparatus for generating a virtual image forming apparatus. For example, the user interface 240 may be a touch screen included in the mobile device 200.

A determination unit (not shown) may determine whether the mobile device 200 is connectable to an external device. In particular, the determination unit (not shown) may determine whether the mobile device 200 is connectable to the image forming apparatus 100.

The storage unit (not shown) may store various pieces of data. In particular, when it is determined by the determination unit (not shown) that the mobile device 200 cannot be connected to the image forming apparatus 100, a job request received by each of the user interface 240 and the communication unit 230 may be stored.

The control unit 230 controls operations of the communication unit 210, the user interface 240, and the storage unit (not shown). Also, the control unit 230 may control an operation of the virtual apparatus generating unit 220.

The cloud server 300 includes a communication unit 310, a virtual apparatus managing unit 320, and a control unit 330.

The communication unit 310 receives a registration request for the virtual image forming apparatus from the mobile device 200, and transmits a job request for the virtual image forming apparatus, registered in the virtual apparatus managing unit 320, to the mobile terminal 200. In addition, the communication unit 310 may receive a connection request for the virtual image forming apparatus from an electronic device (not shown), the communication unit 310 may transmit information about the virtual image forming apparatus registered in the virtual apparatus managing unit 320 in response to the connection request for the virtual image forming apparatus. In particular, the information about the virtual image forming apparatus may include the MAC address of the mobile device 200 associated with the virtual image forming apparatus and capability information of the image forming apparatus 100 associated with the virtual image forming apparatus.

The virtual apparatus managing unit 320 may register the virtual image forming apparatus according to the registration request, received by the communication unit 310, for the virtual image forming apparatus. The virtual apparatus managing unit 320 registers the virtual image forming apparatus in correspondence with the MAC address of the mobile device 200 according to the registration request including information which indicates the image forming apparatus 100 being registered in correspondence with the MAC address.

The control unit 330 controls an operation of the communication unit 310. Also, the control unit 330 may control an operation of the virtual apparatus managing unit 320.

Figure 3:
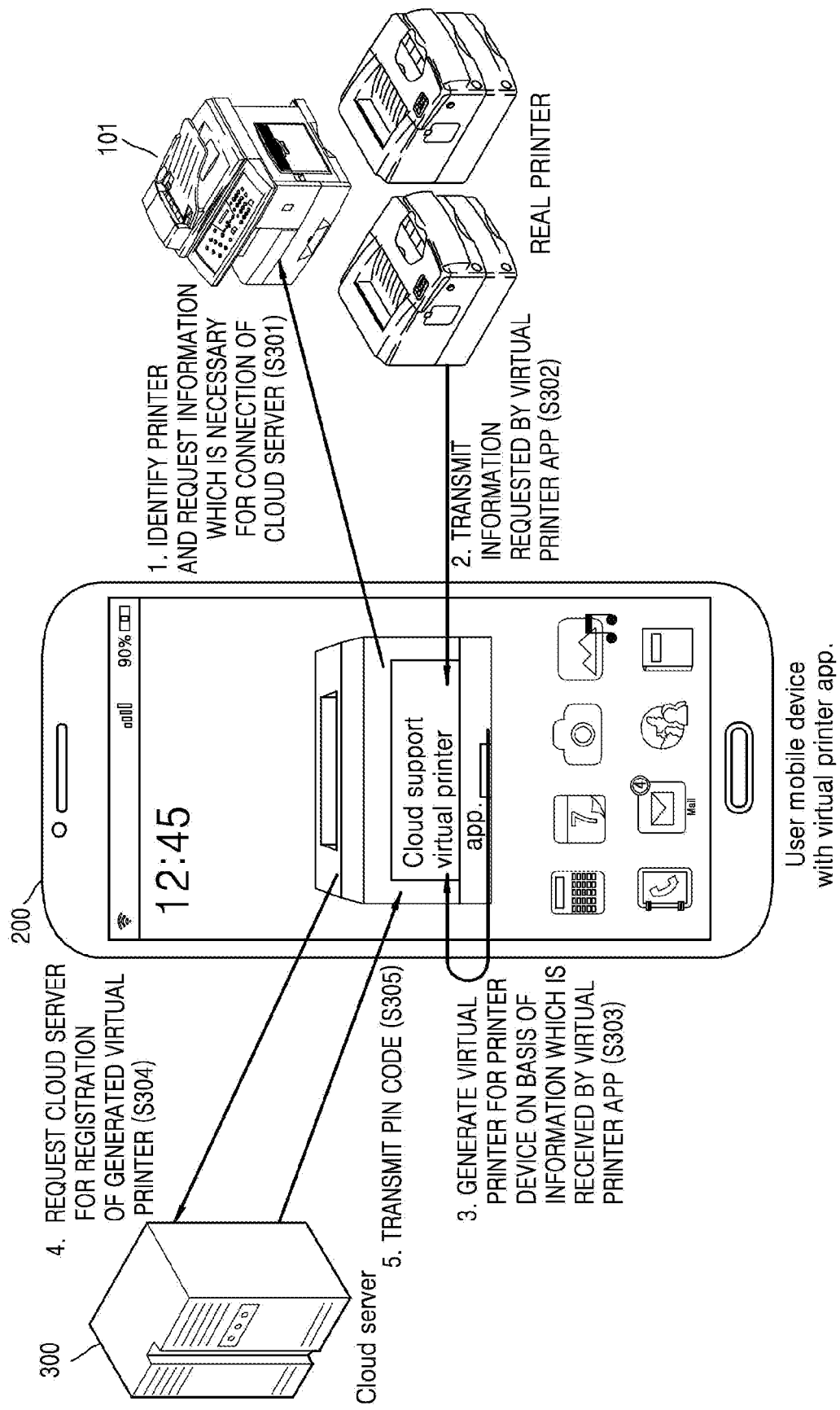
FIG. 3 is a diagram for describing an operation of generating a virtual printer and registering the virtual printer in a cloud server by using an application of a mobile device, according to an embodiment.

FIG. 3 is a diagram for describing an operation of generating a virtual printer and registering the virtual printer in a cloud server by using an application of a mobile device, according to an embodiment.

Referring to FIG. 3, in operation S301, the mobile device 200 identifies the real printer 101 and requests information necessary to register the real printer 101 in the cloud server 300 to the real printer 101. For example, a user searches for the real printer 101 real printer 101 in a virtual printer application, installed in its own mobile device 200, through Wi-Fi, Bluetooth, or near field communication (NFC), and connects the mobile device 200 to the real printer 101. When the mobile device 200 is connected to the real printer 101, by using the virtual printer application, the user requests the real printer 101 for information necessary to register the real printer 101 in the cloud server 300.

In operation S302, the real printer 101 transmits information which is necessary to register the real printer 101 in the cloud server 300 and is requested by the mobile device 200. For example, when the mobile device 200 is connected to the real printer 101, the real printer 101 transmits the information, which is necessary to register the real printer 101 in the cloud server 300, to the mobile device 200 according to a request of the mobile device 200.

In operation S303, the mobile device 200 generates a virtual printer on the basis of the transmitted information which is necessary to register the real printer 101 in the cloud server 300. For example, the user allows the mobile device 200 to generate the virtual printer for the identified real printer 101 on the basis of the information which is necessary to register the real printer 101 in the cloud server 300. The mobile device 200 generates the virtual printer on the basis of the information which is necessary to register the real printer 101 in the cloud server 300.

In operation S304, the mobile device 200 requests the cloud server 300 for registration of the generated virtual printer. The virtual printer is recognized by the cloud server 300 as a printer that supports a cloud printing function, and thus, even though the real printer 101 does not actually support the cloud printing function, the mobile device 200 may request registration. For example, when the user generates the virtual printer by using the virtual printer application, in order to register the generated virtual printer in the user's account which is set in the cloud server 300, the mobile device 200 logs in to the cloud server 300 by using user account information (which is input from the outside) or pre-stored user account information to register, as a printer, the generated virtual printer in the cloud server 300. The mobile device 200 may register the MAC address and a capability of the printer in the cloud server 300 together.

In operation S305, after the virtual printer is registered, the cloud server 300 transmits a PIN code to the mobile device 200. The PIN code is used for authentication when accessing the virtual printer of the mobile device 200 by using the host, namely, when establishing a connection between the host and the virtual printer of the mobile device 200.

Figure 4:
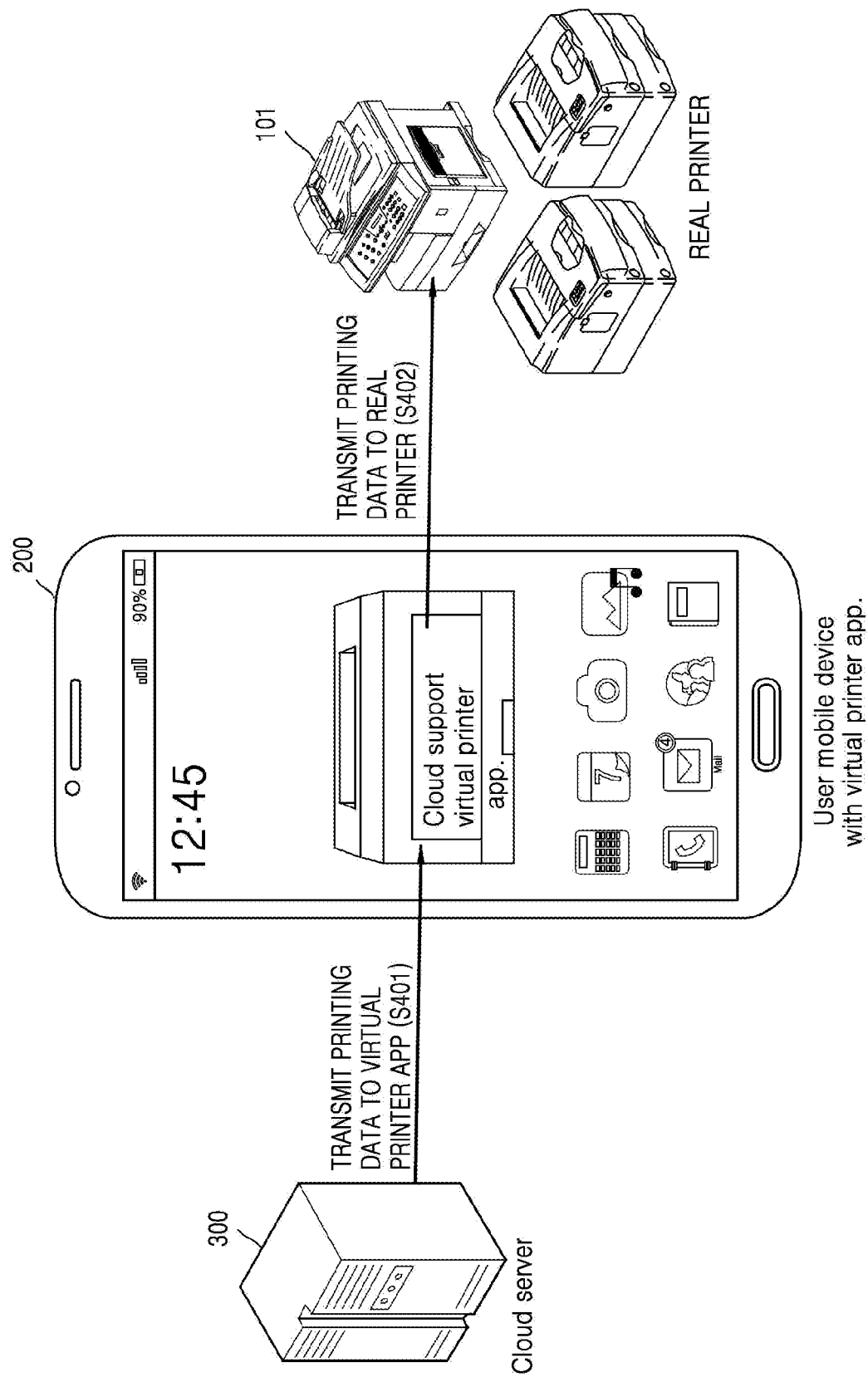
FIG. 4 is a diagram for describing an operation of printing a document by using a virtual printer registered in the cloud server, according to an embodiment.

FIG. 4 is a diagram for describing an operation of printing a document by using a virtual printer registered in the cloud server, according to an embodiment.

Referring to FIG. 4, in operation S401, when the mobile device 200 accesses the cloud server 300 and logs in to the cloud server 300 to select a document included in the cloud server 300, the cloud server 300 transmits printing data to the virtual printer of the mobile device in association with the selected document.

In operation S402, the mobile device 200 transmits, to the real printer 101, the printing data received from the cloud server 300. The mobile device 200 selects a document to be printed. The mobile device 200 selects a virtual printer for performing a printing operation from among printers which are registered in an account of the mobile device 200, and allows the selected virtual printer to print the selected document.

For example, a user logs in to an account of the cloud server 300 to select his(?) own document included in the cloud server 300, selects a virtual printer for performing a printing operation from among printers which are registered in the user's account, and transmits printing data to the selected virtual printer of the mobile device 200. The mobile device 200 that receives the printing data transmits the printing data to the printer, there printing the printing data. The printer is a printer corresponding to a virtual printer.

However, when the mobile device 200 is connected to the real printer 101, the mobile device 200 may transmit the printing data to the real printer 101. For example, when it is determined that the mobile device 200 cannot be connected to the real printer 101, it is unable to transmit the printing data to the real printer 101. In this case, the mobile device 200 may display a message indicating whether to store the printing data, and the user may store the printing data in the mobile device 200. When the mobile device 200 is connected to the real printer 101 later, the stored printing data may be transmitted to and printed by the real printer 101.

Figure 5:
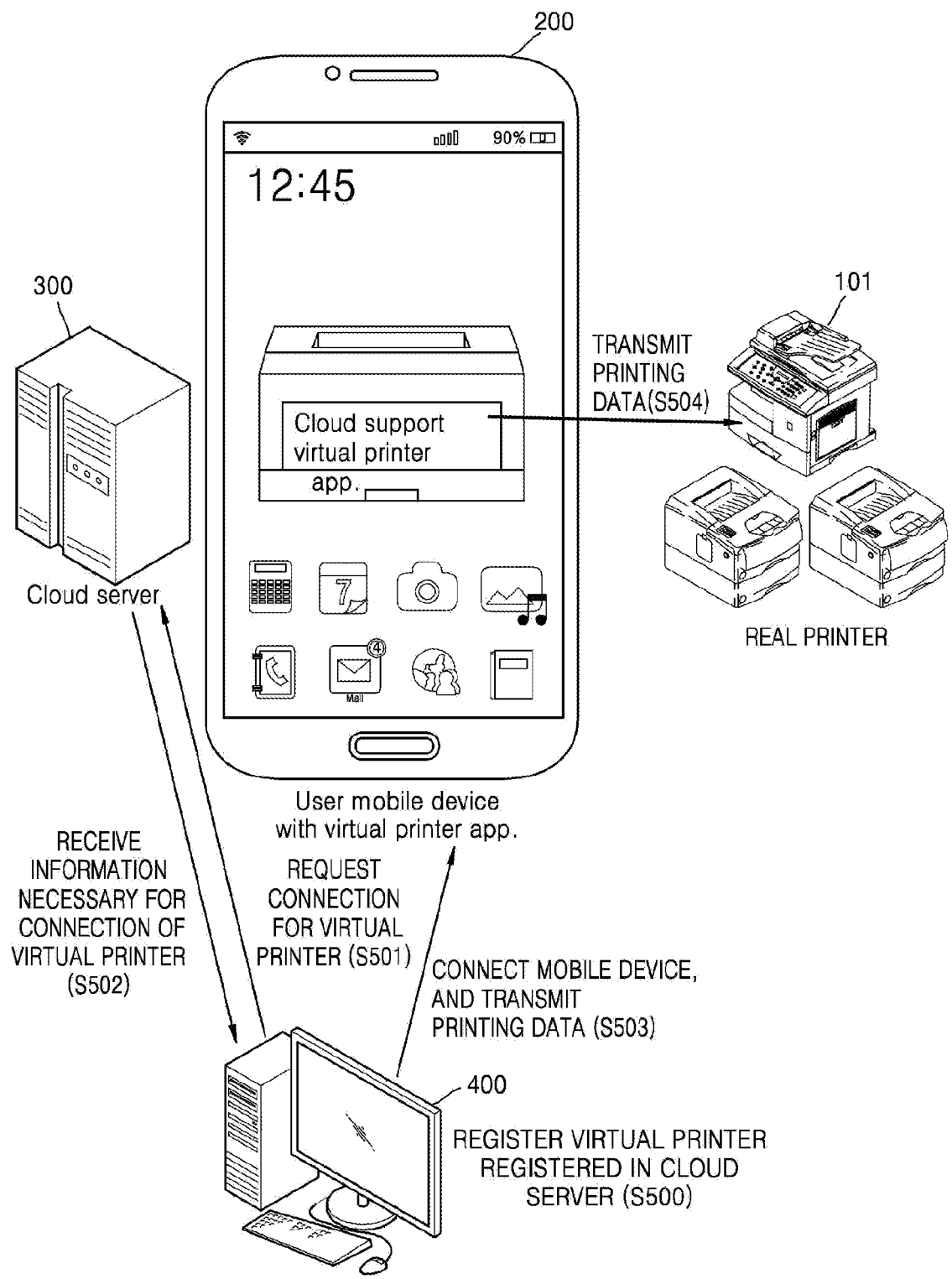
FIG. 5 is a diagram for describing an operation of connecting a host to a virtual printer generated in the mobile device, according to an embodiment.

FIG. 5 is a diagram for describing an operation of connecting a host to a virtual printer generated in the mobile device, according to an embodiment.

Referring to FIG. 5, before operation S501, in operation S500, a user registers a printer through an operation of registering the printer by using a host 400. A port of a registered printer is a port of a virtual printer registered in the cloud server 300.

In operation S501, the host 400 requests a connection through a port of the virtual printer registered in the cloud server 300. At this time, when the cloud server 300 receives the connection request through the port of the registered virtual printer, the cloud server 300 requests a PIN code which is provided to the mobile device 200 in registration. The cloud server 300 receives a PIN code from the host 400 in response to the request, and when the received PIN code matches the PIN code which is provided in registration, the cloud server 300 transmits information, which is necessary for connection of a virtual printer, to the host 400.

In operation S502, the cloud server 300 transmits information which is necessary for connection of the virtual printer generated in the mobile device 200, and the host 400 receives the transmitted information. In this case, the cloud server 300 transmits MAC address information of the virtual printer (i.e., MAC address information of the mobile device 200) and capability information of the virtual printer (i.e., capability information of a real printer) to the host 400, and the host 400 receives information which is necessary for connection of the virtual printer generated in the mobile device 200.

In operation S503, the host 400 is directly connected to the virtual printer of the mobile device 200 by using the received information necessary for connection of the virtual printer. After the connection, the host 400 may transmit printing data to the virtual printer of the mobile device 200.

In operation S504, the mobile device 200 transmits the printing data to the real printer 101 corresponding to the virtual printer. However, even in this case, when the mobile device 200 is connected to the real printer 101, the mobile device 200 may transmit the printing data to the real printer 101. For example, when it is determined that the mobile device 200 cannot be connected to the real printer 101, it is unable to transmit the printing data to the real printer 101. In this case, the mobile device 200 may display a message indicating whether to store the printing data, and the user may store the printing data in the mobile device 200. When the mobile device 200 is connected to the real printer 101 later, the mobile device 200 may transmit the stored printing data to the real printer 101, which may receive and print the printing data.

Figure 6:
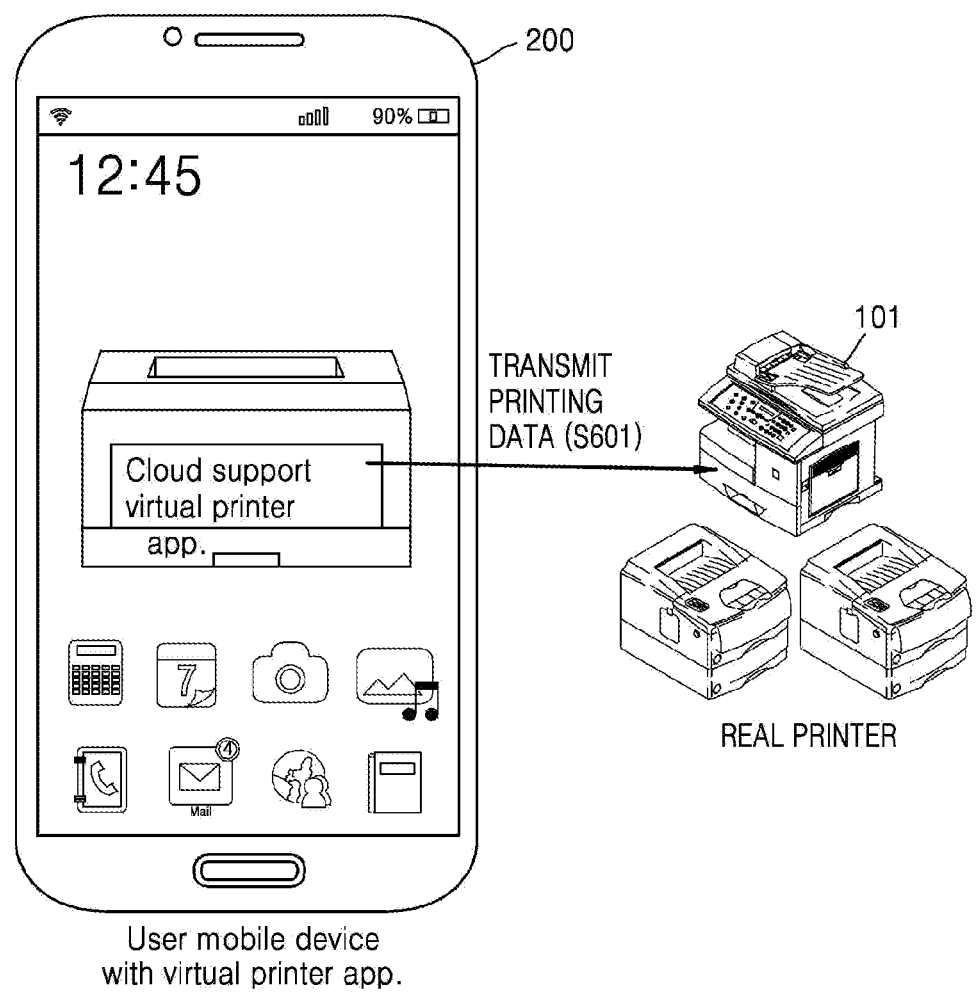
FIG. 6 is a diagram for describing an operation in which a printer prints printing data stored in the mobile device, according to an embodiment.

FIG. 6 is a diagram for describing an operation in which a printer prints printing data stored in the mobile device, according to an embodiment.

Referring to FIG. 6, in operation S601, a mobile device transmits printing data to a real printer. In order to print printing data which is stored in the mobile device, a user executes a virtual printer application and selects the printing data. A list of printable virtual printers is displayed by a display unit according to a format of the selected data. The user selects a virtual printer, which is available at a current place of the user, from among a plurality of the printable virtual printer. When the selected virtual printer is connected to a real printer corresponding thereto, a printing job is performed. However, when the selected virtual printer is not connected to the real printer corresponding thereto, the user confirms the non-connection state, and then, the printer is connected to the mobile device to perform the printing job.

FIGS. 7A and 7B are diagrams for describing a virtual printer generated in the mobile device and a virtual printer registered in the cloud server, according to an embodiment.

Referring to FIG. 7A, virtual printers generated in a mobile device are listed. In the present embodiment, the virtual printers generated in the mobile device are #vp1 and #vp2. The mobile device receives information, which is necessary to generate virtual printers, from a real printer so as to generate a virtual printer. The information necessary to generate a virtual printer may include an MAC address and capability information of the real printer.

Referring to FIG. 7A, the virtual printer #vp1 includes MAC address information "dd.cc.bb.aa" of a real printer corresponding thereto, and also includes capability information of the real printer. For example, the virtual printer #vp1 includes information about whether the real printer is a black-and-white/color printer in the capability information of the real printer. The virtual printer #vp1 includes information in which the real printer corresponding thereto supports all of black-and-white and color. Similarly, the virtual printer #vp2 includes MAC address information "hh.gg.ff.ee" of a real printer corresponding thereto, and also includes information which the real printer supports only black-and-white.

Referring to FIG. 7B, virtual printers registered in a cloud server are listed. In the present embodiment, the virtual printers registered in the cloud server are #vp1 and #vp2. The virtual printers #vp1 and #vp2 are the same as the virtual printers #vp1 and #vp2 of FIG. 7A, respectively. Therefore, the virtual printers #vp1 and #vp2 include the MAC address information "dd.cc.bb.aa" of the same mobile device. The virtual printers #vp1 and #vp2 registered in the cloud server do not include an MAC address of a real printer. That is, when the mobile device registers a virtual printer (which is generated in the mobile device) in the cloud server, the mobile device provides virtual printer information as if an MAC address of the mobile device is an MAC address of the real printer, and thus, the cloud server stores the MAC address of the mobile device as if the MAC address of the mobile device is the MAC address of the real printer. For this reason, the cloud server cannot recognize which of a plurality of printers the real printer is.

Moreover, when the mobile device registers the virtual printer (which is generated in the mobile device) in the cloud server, the mobile device provides capability information of the real printer to the cloud server, and thus, the cloud server includes capability information of a real printer corresponding to the virtual printer. Therefore, the capability information registered in the cloud server is the same information as capability information of the virtual printer which is generated in the mobile device. Referring to FIG. 7B, the virtual printer #vp1 includes capability information in which the real printer corresponding thereto supports all of black-and-white and color, and the virtual printer #vp2 includes capability information which the real printer supports only black-and-white.

Moreover, a virtual printer includes a unique port. Referring again to FIG. 5, when the host requests a connection from the virtual printer registered in the cloud server through the port, by providing an MAC address of the mobile device and capability information which are information necessary for connection of the virtual printers generated in the mobile device, the host may be connected to the virtual printers generated in the mobile device.

Figure 8:
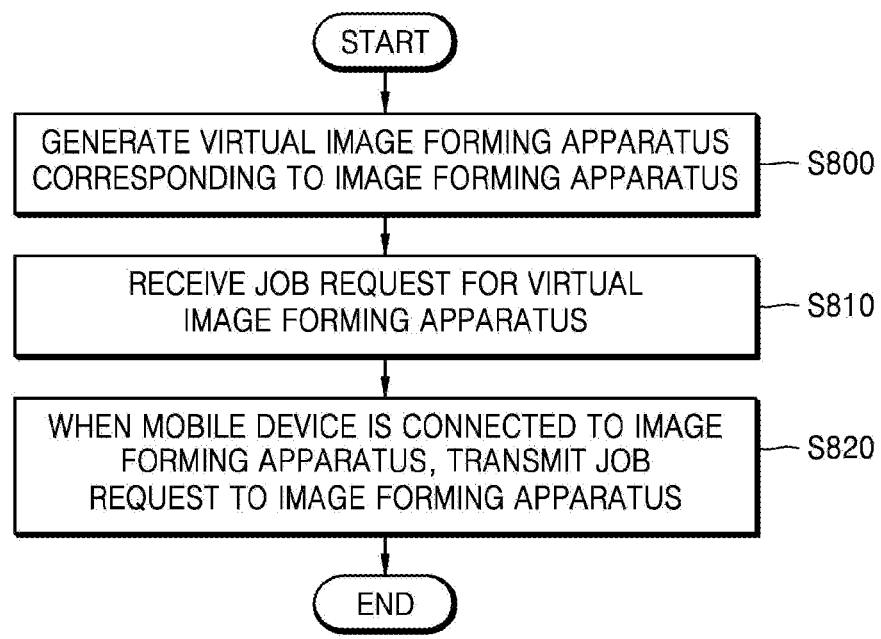
FIG. 8 is a flowchart illustrating a method of performing cloud printing by using a mobile device, according to an embodiment.

FIG. 8 is a flowchart illustrating a method of performing cloud printing by using a mobile device, according to an embodiment.

In operation S800, a mobile device generates a virtual image forming apparatus corresponding to an image forming apparatus.

In operation S810, the mobile device receives a job request for the virtual image forming apparatus. In detail, the mobile device may receive a job request for data, stored in the mobile device, from a user. However, the present embodiment is not limited thereto, and the mobile device may receive a job request for the virtual image forming apparatus from a cloud server or a host.

In operation S820, when the mobile device is connected to the image forming apparatus, the mobile device may transmit the received job request to the image forming apparatus.

Figure 9:
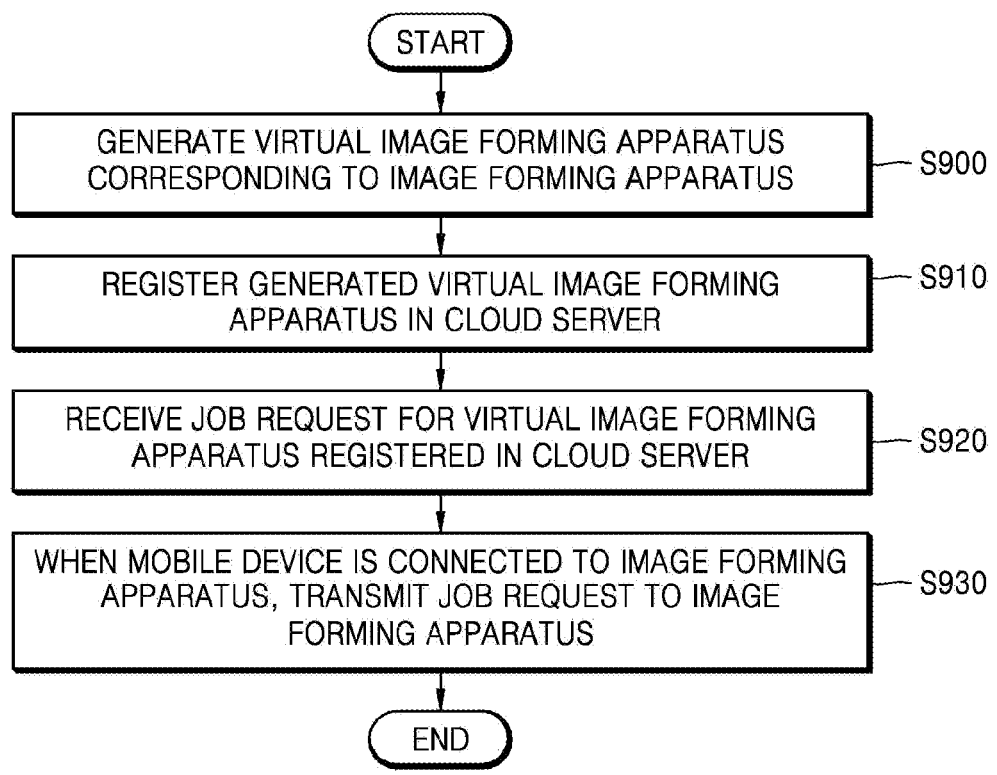
FIG. 9 is a flowchart illustrating a method of performing cloud printing by using a mobile device, according to an embodiment.

FIG. 9 is a flowchart illustrating a method of performing cloud printing by using a mobile device, according to an embodiment.

In operation S900, a mobile device generates a virtual image forming apparatus corresponding to an image forming apparatus.

In operation S910, the mobile device registers the generated virtual image forming apparatus in a cloud server. In detail, the mobile device registers the virtual image forming apparatus in the cloud server in correspondence with an MAC address of the mobile device. In particular, the mobile device provides the MAC address of the mobile instead of an MAC address of a real image forming apparatus corresponding to a virtual image forming apparatus, and registers a virtual image forming apparatus, corresponding to the provided MAC address, in the cloud server. Therefore, the cloud server cannot know the MAC address of the real image forming apparatus, and recognizes the MAC address of the mobile device as if the MAC address of the mobile device is the MAC address of the real image forming apparatus.

In operation S920, the mobile device receives a job request for the virtual image forming apparatus registered in the cloud server. That is, when a job for the virtual image forming apparatus registered in the cloud server is requested through an electronic device, the cloud server transmits the job request for the registered virtual image forming apparatus, and the mobile device receives the job request for the virtual image forming apparatus registered in the cloud server. In this case, the job request for the virtual image forming apparatus may be transmitted by using an MAC address of the mobile device associated with the virtual image forming apparatus registered in the cloud server.

In operation S930, when the mobile device is connected to the image forming apparatus, the mobile device transmits the received job request to the image forming apparatus.

That is, the mobile device always includes a virtual image forming apparatus irrespective of being connected to the real image forming apparatus, and when a request for the virtual image forming apparatus is received but the mobile device is not connected to the image forming apparatus, the mobile device cannot transmit a job request for a real image forming apparatus corresponding to a virtual image forming apparatus. However, when the mobile device is connected to the image forming apparatus, the mobile device transmits the job request for the real image forming apparatus corresponding to the virtual image forming apparatus.

Figure 10:
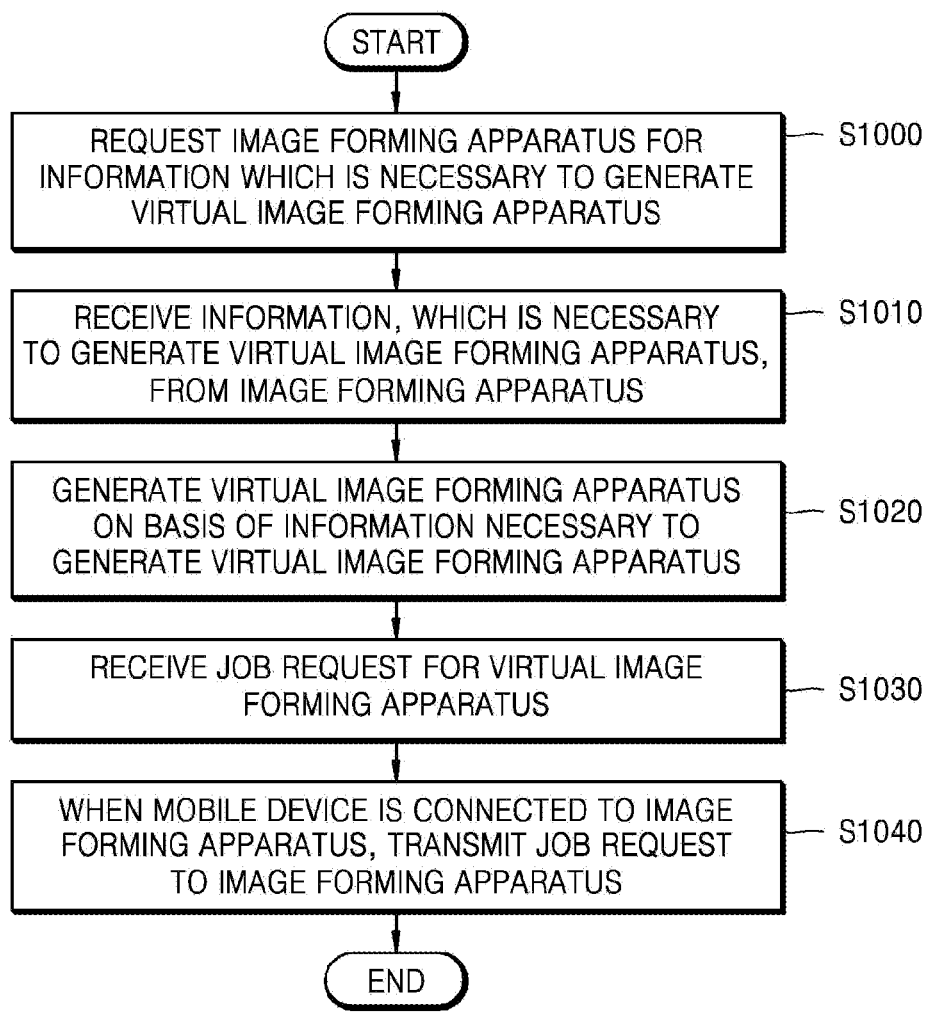
FIG. 10 is a flowchart illustrating a method of performing cloud printing by using a mobile device, according to an embodiment.

FIG. 10 is a flowchart illustrating a method of performing cloud printing by using a mobile device, according to an embodiment.

In operation S1000, a mobile device requests an image forming apparatus for information which is necessary to generate a virtual image forming apparatus. In this case, the mobile device searches for peripheral image forming apparatuses to identify which of the peripheral image forming apparatuses the mobile device is connectable to, and the mobile device is connected to one of the identified image forming apparatus to request one of the connected image forming apparatus for the information which is necessary to generate the virtual image forming apparatus. The information necessary to generate the virtual image forming apparatus may include at least one of an MAC address and capability information of the image forming apparatus.

In operation S1010, the mobile device receives the requested information, which is necessary to generate the virtual image forming apparatus, from the image forming apparatus.

In operation S1020, the mobile device generates the virtual image forming apparatus on the basis of the received information necessary to generate the virtual image forming apparatus.

In operation S1030, the mobile device receives a job request for the virtual image forming apparatus.

In operation S1040, when the mobile device is connected to the image forming apparatus, the mobile device transmits the received job request to the image forming apparatus.

Figure 11:
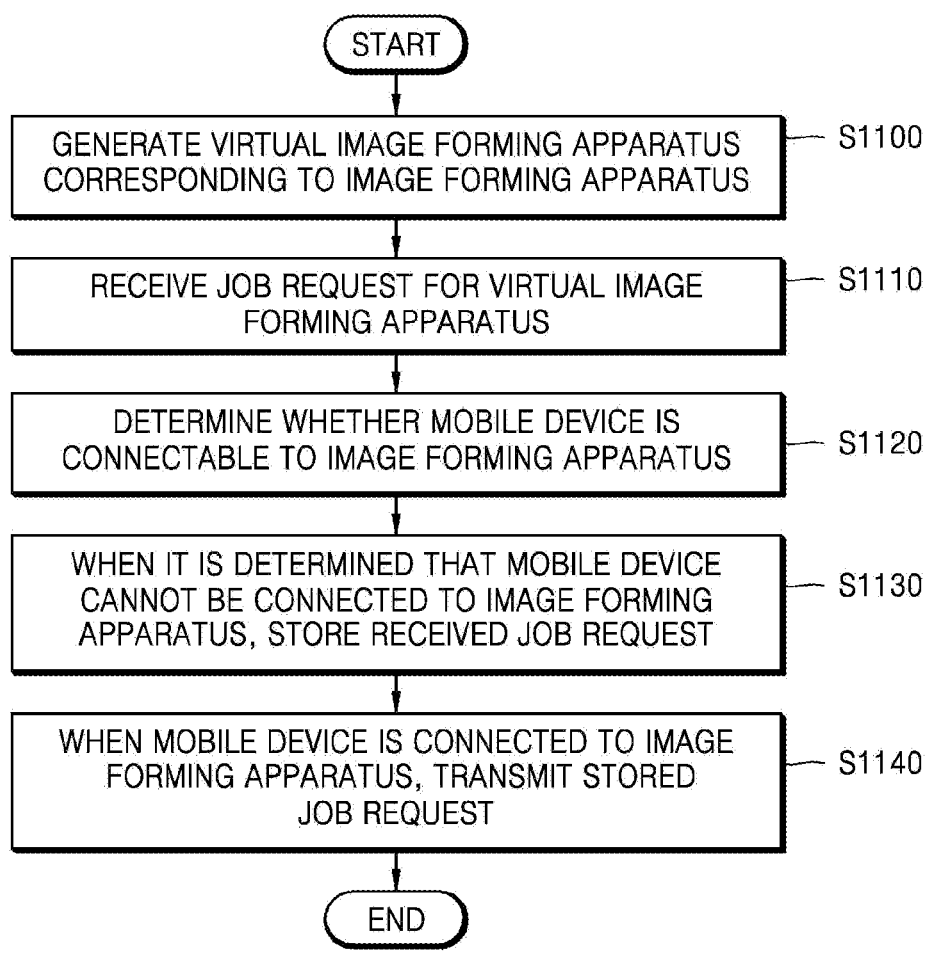
FIG. 11 is a flowchart illustrating a method of performing cloud printing by using a mobile device, according to an embodiment.

FIG. 11 is a flowchart illustrating a method of performing cloud printing by using a mobile device, according to an embodiment.

In operation S1100, the mobile device generates a virtual image forming apparatus corresponding to an image forming apparatus.

In operation S1110, the mobile device receives a job request for the virtual image forming apparatus.

In operation S1120, the mobile device determines whether the mobile device is connectable to the image forming apparatus.

In operation S1130, when it is determined in operation S1120 that the mobile device cannot be connected to the image forming apparatus, the mobile device stores the received job request.

In operation S1140, when the mobile device is connected to the image forming apparatus, the mobile device transmits the stored job request to the image forming apparatus.

As described above, according to the one or more embodiments, a physical connection between a cloud server and an image forming apparatus may be removed in a cloud printing operation. That is, since the image forming apparatus receives printing data via a mobile device, despite there being no physical connection between the cloud server and the image forming apparatus, when the mobile device is connected to the cloud server, the mobile device may receive a job request from the cloud server, and when the mobile device is connected to the image forming apparatus, the mobile device may transmit the job request to the image forming apparatus. Even though the image forming apparatus does not support a real cloud printing function, the cloud printing service may be provided by using a virtual image forming apparatus. In particular, a user easily carries the mobile device, and thus, when the image forming apparatus is not easily connected to an electronic device, the mobile device receives data from the electronic device, and the user moves the mobile device to a place, which is connectable to the image forming apparatus, to perform operation. Accordingly, a problem of a physical connection is solved.

Embodiments may be written as programs and can be implemented in general-use digital computers that execute the programs using a non-transitory computer readable recording medium.

Examples of non-transitory computer readable recording medium include magnetic storage media (e.g., ROM, floppy disks, hard disks, etc.) and optical recording media (e.g., CD-ROMs, or DVDs).

Processes, functions, methods, and/or software in apparatuses described herein may be recorded, stored, or fixed in one or more non-transitory computer-readable media (computer readable storage (recording) media) that includes program instructions (computer readable instructions) to be implemented by a computer to cause one or more processors to execute (perform or implement) the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions may be executed by one or more processors. The described hardware devices may be configured to act as one or more software modules that are recorded, stored, or fixed in one or more non-transitory computer-readable media, in order to perform the operations and methods described above, or vice versa. In addition, a non-transitory computer-readable medium may be distributed among computer systems connected through a network and program instructions may be stored and executed in a decentralized manner. In addition, the computer-readable media may also be embodied in at least one application specific integrated circuit (ASIC) or Field Programmable Gate Array (FPGA).

It should be understood that exemplary embodiments described therein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the present disclosure as defined by the following claims.

What is claimed is:

1. A method of performing cloud printing by using a mobile device, the method comprising:
   generating a virtual apparatus registerable to a cloud server, corresponding to identification information of an image forming apparatus, in the mobile device in response to the image forming apparatus receiving a request for information which is necessary to generate the virtual apparatus from the mobile device, wherein the information which is necessary to generate the virtual apparatus includes the identification information of the image forming apparatus;
   registering the generated virtual apparatus in the cloud server;
   receiving, by the mobile device and from the cloud server, a job request for the virtual apparatus; and
   when the mobile device is connected to the image forming apparatus, transmitting the received job request to the image forming apparatus,
   wherein the image forming apparatus is not directly connectable to the cloud server, and
   wherein the registered virtual apparatus corresponds to identification information of the mobile device.

2. The method of claim 1, wherein the registering of the generated virtual apparatus comprises registering the virtual apparatus in correspondence with a medium access control (MAC) address of the mobile device.

3. The method of claim 1, wherein the transmitting comprises:
   determining whether the mobile device is connectable to the image forming apparatus;
   when it is determined that the mobile device cannot be connected to the image forming apparatus, storing the received job request for the virtual apparatus; and
   when the mobile device is connected to the image forming apparatus, transmitting the stored job request for the virtual apparatus to the image forming apparatus.

4. The method of claim 1, wherein the job request for the virtual apparatus is transmitted by using a medium access control (MAC) address of the mobile device associated with the virtual image forming apparatus registered in the cloud server.

5. The method of claim 1, wherein the generating of the virtual apparatus comprises:
   receiving the information, which is necessary to generate the virtual apparatus, from the image forming apparatus in response to the request for information necessary to generate the virtual apparatus; and
   generating the virtual apparatus, based on the information necessary to generate the virtual apparatus.

6. The method of claim 5, wherein the information necessary to generate the virtual apparatus comprises at least one of a medium access control (MAC) address and a capability of the image forming apparatus.

7. The method of claim 6, wherein the capability of the image forming apparatus includes only black-and-white printing or both color printing and black-and-white printing.

8. A cloud printing system comprising:
   a mobile device that includes at least one hardware processor: a virtual apparatus generator configured to generate a virtual apparatus registerable to a cloud server corresponding to identification information of an image forming apparatus in response to the image forming apparatus receiving a request for information which is necessary to generate the virtual apparatus from the mobile device wherein the information which is necessary to generate the virtual apparatus includes the identification information of the image forming apparatus; a communicator configured to transmit a registration request for the generated virtual apparatus, receive a job request for the generated virtual apparatus, and transmit the received job request for the generated virtual apparatus to the image forming apparatus; and a controller configured to control the communicator of the mobile device to transmit the registration request for the generated virtual apparatus, receive the job request for the generated virtual apparatus, and transmit the received job request for the generated virtual apparatus to the image forming apparatus;
   a cloud server that includes at least one hardware processor: a virtual apparatus manager configured to register the generated virtual apparatus according to the registration request; a communicator configured to receive the transmitted registration request for the generated virtual apparatus from the mobile device, and transmit a job request for the generated virtual apparatus, registered in the virtual apparatus manager, to the mobile device; and a controller configured to control the communicator of the cloud server to receive the transmitted registration request for the generated virtual apparatus from the mobile device and transmit a job request for the generated virtual apparatus, registered in the virtual apparatus manager, to the mobile device; and the image forming apparatus that includes at least one hardware processor: a communicator configured to receive the job request for the generated virtual apparatus; a job performer configured to perform operation, based on the received job request for the generated virtual apparatus; and a controller configured to control the communicator of the image forming apparatus to receive the job request for the generated virtual apparatus, wherein the image forming apparatus is not directly connectable to the cloud server, and wherein the registered virtual apparatus corresponds to identification information of the mobile device.

9. At least one non-transitory computer readable medium storing computer readable instructions which when executed control at least one processor to implement a method of claim 1.

* * * * *